United States Patent [19]
Yager

[11] 3,904,289
[45] Sept. 9, 1975

[54] FLIGHT SIMULATOR VISUAL DISPLAY SYSTEM

[75] Inventor: William C. Yager, Blue Bell, Pa.

[73] Assignee: The United States of America as represented by the Secretary of the Navy, Washington, D.C.

[22] Filed: Jan. 10, 1975

[21] Appl. No.: 540,047

[52] U.S. Cl. ............... 353/122; 35/12 N; 350/27; 350/55; 350/129; 352/69; 352/132; 353/69
[58] Int. Cl.²...G03B 37/00; G03B 21/60; G03B 21/28; G09B 9/08
[58] Field of Search............ 35/12 N, 12 K; 352/69, 352/132; 350/129, 27, 55; 353/122, 11, 69, 70

[56] References Cited
UNITED STATES PATENTS

| | | |
|---|---|---|
| 2,152,297 | 3/1939 | Wilson .................. 350/129 |
| 3,281,519 | 10/1966 | Giordano .................. 35/12 N |
| 3,557,470 | 1/1971 | Emerick et al. ............ 35/12 N |
| 3,572,893 | 3/1971 | Bennett et al. ............. 350/55 |

*Primary Examiner*—Richard E. Aegerter
*Assistant Examiner*—Steven L. Stephan
*Attorney, Agent, or Firm*—R. S. Sciascia; Henry Hansen; Robert J. Mooney

[57] ABSTRACT

A wide field, high brightness, large exit pupil, visual display system for a flight simulator includes two stage projection to correct for perspective and a rotating periscope for scene integration and ultimate display to a pilot positioned at an exit pupil conjugate to the periscope projector.

6 Claims, 7 Drawing Figures

PATENTED SEP 9 1975

FLIGHT SIMULATOR VISUAL DISPLAY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to visual displays for flight simulators and in particular to visual displays including apparatus for correcting perspective.

Flight simulators are almost as old as aviation itself. Historically, their principal use has been for training. Most flight simulators in existence today are intended for some form of instruction. The duplication of flight experience in a simulator is generally less costly, all things considered, than flight in a real aircraft; and for large and expensive aircraft, economic considerations make simulators virtually mandatory.

Flight simulators have important uses other than training, however. In recent years dynamic flight simulators have proved invaluable in research, development and design tools. Aside from factors or economy, simulators are important because in them it is possible to experience flight in aircraft which do not yet exist or which are otherwise inaccessible as, for example, enemy craft known only in terms of technical data, or captured materiel of limited stock or too damaged to fly. It is possible also to examine maneuvers which in real aircraft would result in crashes, and to generate rapidly a large body of statistical performance data which would otherwise be difficult, impossible, or too expensive to procure.

A fighter pilot and his aircraft constitute perhaps the most complex man-machine system of major significance in the world today. To a limited extent it is possible to develop a mathematical model of such a complex system—pilot included—and to examine certain aspects of performance and behavior with a large computer. Full computer simulation is of limited value, however, because a fighter pilot is much too complex to model satisfactorily except for an extremely limited range of action. A better approach is to model only the airplane and to use a real pilot in the loop. This class of apparatus is known, reasonably enough, as the piloted simulator. To make use of a real pilot and to have him behave naturally, it is necessary to surround him with a replica of the flight envoronment sufficiently complete and convincing to allow pilot action to be instinctive and automatic. It is not too difficult to put the pilot into a realistic mockup of a cockpit and to cause the instruments to read correctly. It is also not too difficult to mount the cockpit on a moving base able to provide kinesthetic cues consistent with airplane maneuver. But it is quite difficult to surround the pilot with satisfactory visual replica of the real world outside, one which looks realistic and moves naturally in response to the pilot's actions. Throughout the world, much effort has been devoted to developing displays of this class. Many technical approaches have been tried, as numerous patents and published papers testify, but all designs so far reported have deficiencies of one sort or another, many of them serious.

Flight visual simulation by itself is difficult enough, but air combat simulation is even more demanding. Air combat simulation is more complex and difficult than single aircraft flight simulation because it necessarily involves at least two independently piloted aircraft interacting with one another in real time. Furthermore, visual fidelity is even more crucial because instantaneous response is the very essence of air combat, and defects in the visual simulation which hinder that instantaneous and automatic response tend to defeat the purpose of the simulation and vitiate the results.

SUMMARY OF THE INVENTION

Accordingly it is an object of this invention to provide a visual display system which can be combined with a dynamic aircraft simulator to create an improved air combat simulator which can be used to explore such things as:

a. Human factors research, such as pilot response time, pilot movement patterns and envelopes;

b. Airplane requirements specification, such as cockpit and canopy requirements, airplane dynamic characteristics;

c. Man/machine interface requirements, such as controls placement and usability, instrument placement and readability;

d. Combat maneuver design and experimentation, such as for missile launch and evasion, or emergency actions following combat damage; and e. Aircraft performance evaluation, such as of hypothetical aircraft or proposed modifications, or of world aircraft for intelligence purposes.

It is a further object of this invention to provide a visual display system having a virtually full spherical field of view, having perspective corrected to the simulator pilot's eye position for all possible maneuvers, having a large exit pupil allowing normal pilot head movement, and having high brightness, high resolution imagery. These and other objects of the invention are achieved as follows.

An air combat simulator of the type considered here may be resolved into four basic systems: the display system, which presents the visual environment to the pilot, the scene generation system, which feeds the display, the mechanical system, of which the cockpit and the moving base are the most important components, and the control computer system, which runs the system. The invention set forth herein concerns the display system only but reference may be made to the other systems from time to time for clarity of presentation.

In its elemental form the display system includes a scene viewed by a fisheye pickup and thereafter projected onto a first stage display. The first stage display is viewed by a second fisheye pickup and relayed to a second stage display for presentation to a simulator pilot. First stage projection and pickup are accomplished at conjugate points. Second stage projection and exit pupil are also set at conjugate points. The use of two stages of display and conjugate point projection and pickup corrects perspective to the pilot's eye position. The first and second stage displays are both spherical dimpled mirrors, which permit controlled exit pupil expansion. A multiplicity of scenes are presented to the second stage display by employing a plurality of first stage displays whose pickup images are optically multiplexed.

Other objects, advantages and novel features of the invention will become apparent from the following detailed description of the invention when considered in conjunction with the accompanying drawings.

DESCRIPTION OF PREFERRED EMBODIMENT

A major part of training simulators is the visual display system, which allows the pilot or operator to perceive the real world and react to it in a natural manner. The ideal characteristics of such a display include: (1) a very wide field, at least equal to the field of normal binocular vision; (2) a large exit pupil, allowing normal pilot head movement; (3) high resolution imagery, equalling that of the human eye; (4) high image brightness, at least equal to indoor motion picture projection standards; and (5) true geometric perspective, corrected to the pilot's eye position.

Practical quantitative goals for a display of this type include: (1) a 90° × 180° field, expandable to a full sphere, (2) a one square foot exit pupil, (3) a highlight brightness of 10 ft-lamberts, (4) resolution equivalent to 10,000 TV lines over 180°, and (5) perspective corrected to the pilot's eye position for all look directions. The manner in which these goals are realized in the present invention is described below.

It is possible to display a full hemispherical field by using 180° fisheye lenses for both pickup and projection, the inherent distortion being removed by the symmetry of the relay system. Modern fisheye lenses (a good example is the Minolta 18mm f/2.8) are capable of resolution equal to or better than the human eye over almost their entire field. To make the scene visible to the observer, some form of screen or optical field element must be interposed between projector and observer. If a hemispherical field is to be projected, this screen or field element will most conveniently be also of hemispherical shape. If a specular field element is used, such as a hemispherical mirror, with projector and pilot at conjugate points, the exit pupil at the observer will be an unmagnified image of the fisheye lens pupil. Fisheye lens pupils are necessarily small (typically only a few millimeters in diameter), so to see the display the observer would have to place his eye at this small exit pupil. The scene could be made to appear extremely bright, since the system is specular, but binocular vision would be impossible and the pilot could not move his head without losing the picture. A specular screen is therefore impractical. If a diffuse screen is employed, the entire screen will be visible, and the pilot can move his head without losing the picture, but brightness will be drastically reduced and contrast will be affected.

To recover as much brightness as possible consistent with the need for an enlarged exit pupil, it is necessary to use a semi-specular screen such as the dimpled mirror 36 illustrated in FIGS. 1a and 1b and discussed further hereinbelow. Using a dimpled mirror whose microstructure is too small to be resolved, it is possible (1) to expand the exit pupil to just what is needed to accommodate pilot head movement, (2) to illuminate that exit pupil uniformly so that the image appears equally bright from any position within the pupil, (3) readily to achieve indoor motion picture projection standards of brightness (10 to 20 ft-lamberts) with practical sources, and (4) to eliminate contrast loss completely.

Figure 2:
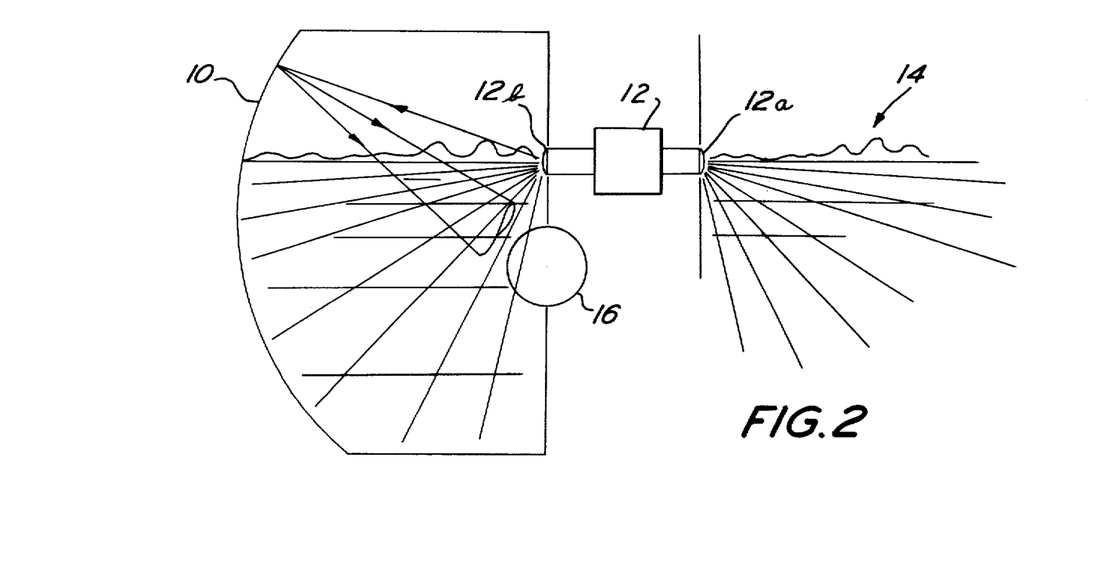
FIG. 2 shows distortion phenomenon with single stage display systems.

FIG. 2 illustrates the phenomenon of distortion in single stage display systems. A fisheye relay 12, i.e., a passive 1:1 relay periscope, views a scene 14 by means of fisheye pickup 12a and transmits the image of the scene 14 to a fisheye projector 12b which projects the image of the scene 14 onto the dimpled mirror 10. The mirror 10 in turn forms an enlarged exit pupil 16, designated by a circle in FIG. 2.

It is clear from FIG. 2 that if an image is relayed directly from fisheye pickup 12a to fisheye projector 12b, the scene 14 will appear distorted to the observer at the exit pupil 16 because the center of perspective will not be at the observer's eye but at the projection lens 12b pupil. This phenomenon is a major flaw in contemporary simulators and is responsible for much of the unfavorable experience reported.

Figure 3:
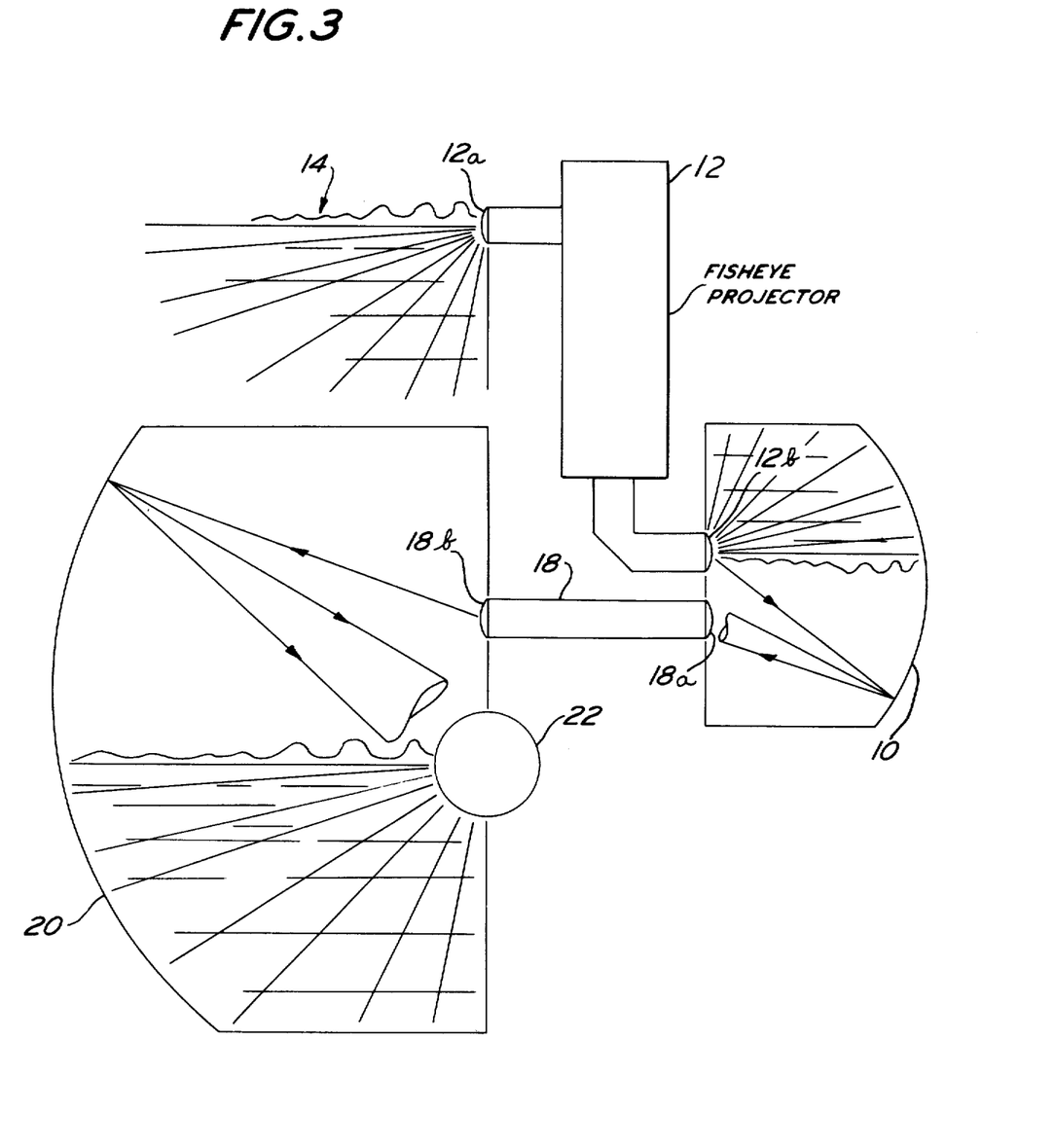
FIG. 3 shows a two stage, perspective correcting, display system according to the invention.

This condition can be corrected, however, by using two-stage projection, as shown in FIG. 3. In two-stage projection the center of perspective is effectively placed at the pilot's eye for all look directions. FIG. 3 illustrates a typical two-stage projection scheme including the scene 14, the passive 1:1 fisheye relay 12 with fisheye pickup 12a and fisheye projector 12b, the first stage dimpled mirror 10, a passive 1:1 relay periscope 18 with fisheye pickup 18a and fisheye projector 18b, and a second stage dimpled mirror 20.

In operation, the visual material or scene 14 is viewed by fisheye pickup 12a and its image is projected through an identical fisheye projection lens 12b onto the first dimpled spherical display screen 10. The pickup fisheye 18a of the relay periscope 18 is situated conjugate to the projector 12b in the first display screen 10, and the projection fisheye 18b of the periscope 18 is situated conjugate to the exit pupil 22 in the second display screen 20. One skilled in the optical art can readily appreciate from this description and from FIG. 3 that by means of this two-stage process the original projection is relayed to an observer at the exit pupil 22 such that the center of perspective is effectively placed at the observer's eye, and that the observer is thereby caused to see the projected scene in true perspective—that is, as though his eye were at the pupil of the original pickup lens 12a.

It should be noted here that the scene 14 and the passive 1:1 relay 12 may be replaced by a comprehensive scene generator which incorporates models, computer generated scenes and other sources of scene information. The information generated by such a scene generator can be transmitted to the first stage display 10 by means of a conventional TV camera viewing the scene and providing signals to a conventional TV link which in turn feeds signals to a conventional light valve or other suitable projector.

The apparatus and fundamental principles disclosed hereinabove can be extended and adapted to the display of a substantially full spherical field of view by the addition of supplementary apparatus. The extension to the display of a full spherical field of view requires (1) the addition of a second means to generate an image filling a second hemisphere, complementary to the first, (2) the addition of a second first-stage display screen to receive a projection of that complementary hemisphere, and (3) the substitution of a scanning relay periscope with two pickup heads for the original static relay periscope 18 with only one pickup head 18a. The simplest form of such extension is illustrated in FIG. 4, and details of the scanning periscope are shown in FIG. 5 together with details of the initial display screens.

Figure 4:
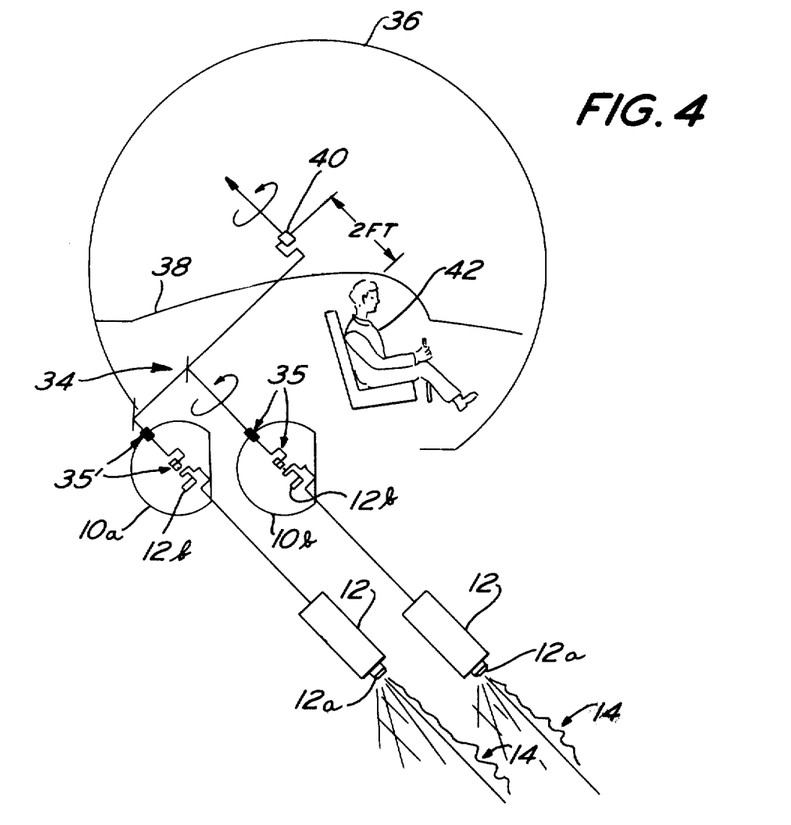
FIG. 4 is an overall diagram of a two stage display system according to the invention.
Figure 5:
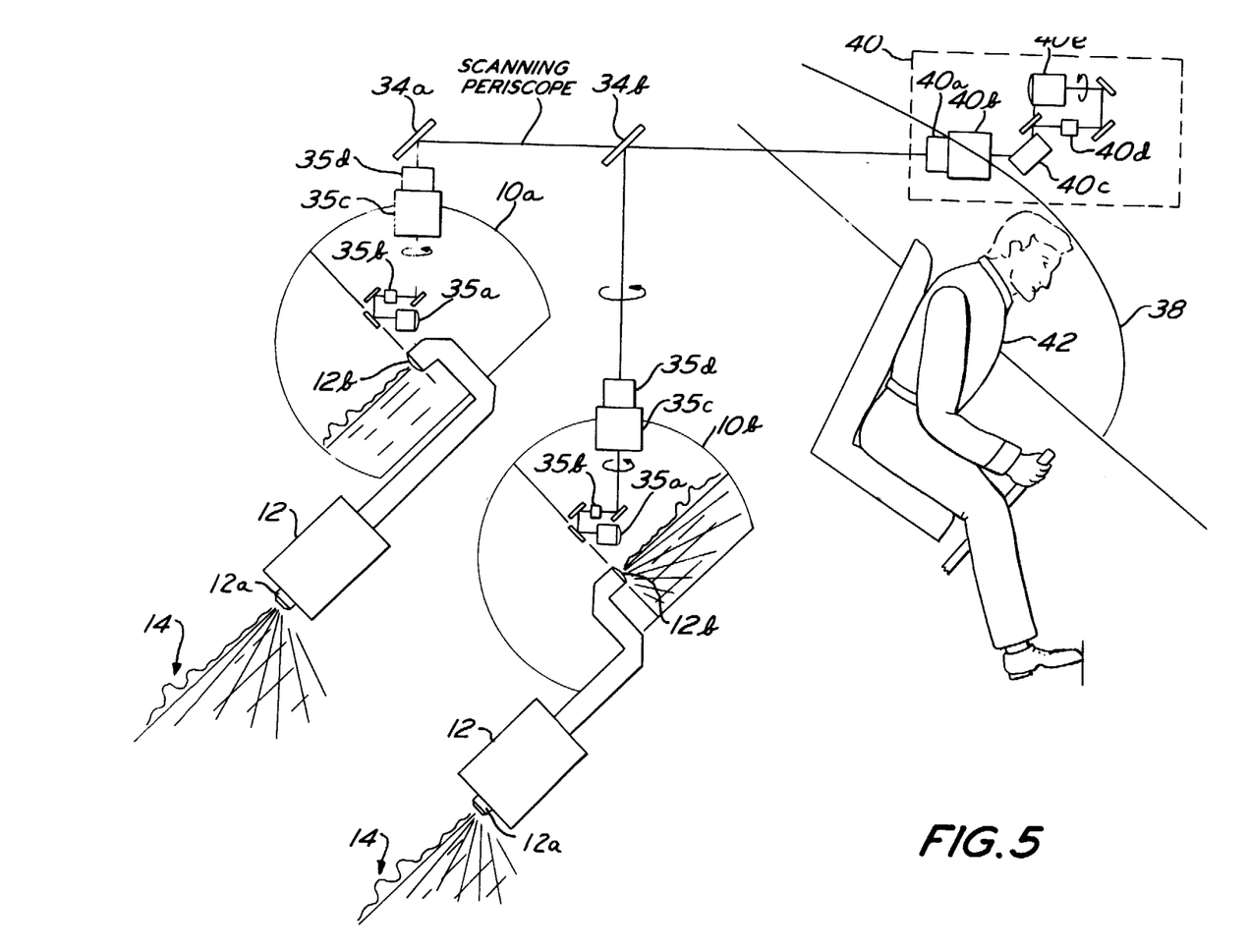
FIG. 5 is a detailed view of the device shown in FIG. 4.

As shown in FIG. 4, the principal elements of the display system are the initial or first-stage display mirrors 10a, 10b, the scanning periscope 34 including a rotating projection head 40 and a main display mirror 36. The initial displays are located below and behind a simulator pilot 42 within a fuselage mockup 38 so as not to intrude significantly into the display space. The rotation axis of the scanning periscope 34 is set at approximately 45° to the vertical to ensure that image resolution is greatest in the upper forward hemisphere of the main display mirror 36, and the placement of the periscope 34 and its rotating projection head 40 is chosen to minimize physical obstruction of the surrounding scene. Each of these principal elements will be discussed in detail hereinbelow.

With further reference to FIG. 4, the dimpled main display mirror 36 has three functions. First, it provides a point-symmetrical, real-image surface. Second, it is of sufficient size to ensure that this real image is at least no closer than the empty field eye rest position, i.e., approximately six feet, a distance beyond which perspective cues with respect to distance have been found in practice to dominate the muscular cues of convergence and accommodation. Thirdly, it operates to magnify the entrance pupil, which may be as small as a few millimeters in diameter, to an exit pupil sufficiently large to be useful to the pilot, i.e., at least one square foot in area, with a substantially rectangular shape.

The main display mirror 36 surface is basically a sphere. (Strictly speaking, since entrance and exit pupils are separated by some significant distance, an ellipsoid might seem more appropriate than a sphere. But for a two-foot separation in a 15-foot diameter sphere, the off-axis aberrations introduced are negligible for the present application. A sphere is therefore the indicated point-symmetrical surface to be employed.) To ensure that the real image is at or beyond the empty field eye rest position, the sphere should be at least 12-feet in diameter, with 15-feet preferred. A sphere this size can be built up from identical sections by basing it on one of the regular polyhedra, as the icosahedron. Further subdivision into non-regular subsections is also possible. A large number of identical mirror sections can be economically replicated from a single master by electroforming. One such dimpled mirror section is shown in FIG. 1a.

To expand the exit pupil (situated at the pilots's 42 head) from a few square millimeters to something approximating a square foot requires dimpling of the mirror 36. Dimpling is accomplished by striking the surface of a metal master with a tool consisting of a large number of small spherical surfaces in regular array such that the area so struck takes the form of a matrix of small spherical indentations. This process is repeated (most conveniently on a numerically controlled machine tool) until the entire surface of the master is covered with a regular array of spherical indentations.

Figure 1A:
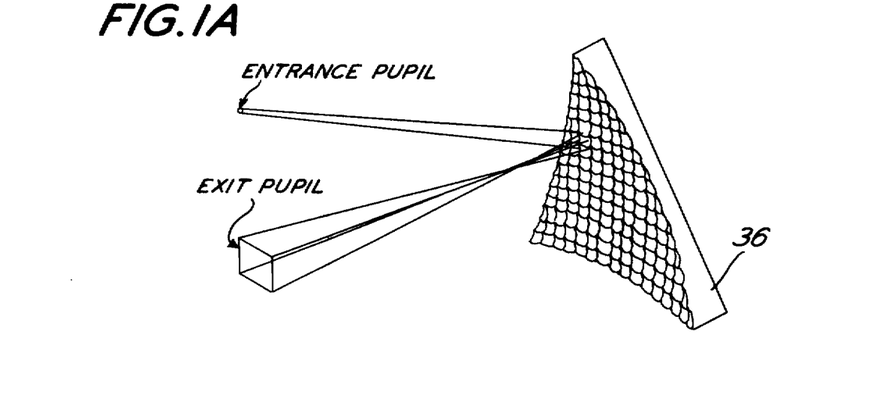
FIGS. 1a and 1b show the principle of exit pupil expansion with use of a dimpled mirror according to the invention.
Figure 1B:
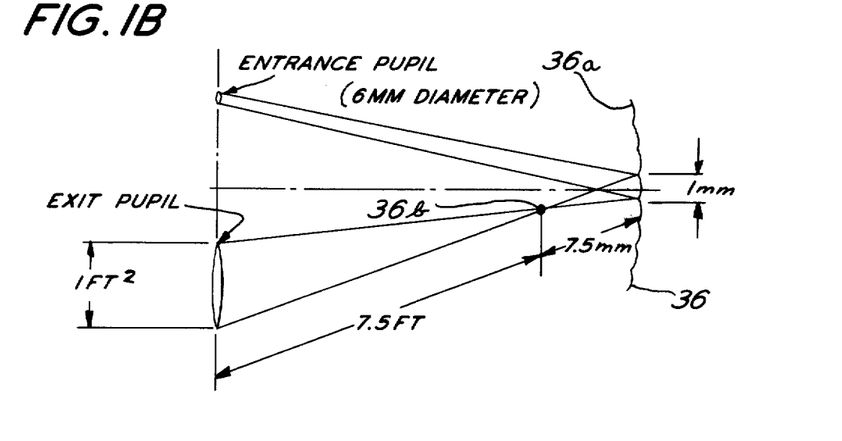

The method of expanding the exit pupil by means of a dimpled mirror is shown diagrammatically in FIGS. 1a and 1b. The main display mirror 36 comprises a large-radium spherical array of many, many small spherical mirrors. The radius of the array is of course 7.5 feet, that of the main display mirror 36. The radius of the individual spherical facets is chosen, along with the size of the facets, to produce an exit pupil of the desired size. If the radius of the main display mirror is 7.5 feet, the size of the dimples must be such that at this distance they are unresolved. To be unresolved at 7.5 feet, i.e., subtend a minute of arc or less, a single facet should not be larger than 0.75 mm. Since it is unlikely that imagery quite that good is required in all situations, a reasonable compromise figure may range from 1.0 to 2.0 mm per facet. It will be very hard indeed for even a sharp-eyed pilot 42 to be aware of this kind of dimpling during operation of the display system.

With further reference to FIG. 1b, the image being projected is formed at or near the surface of the main spherical display mirror 36. Light falling on a single facet 36a, coming as it does from a source subtending only two or three milliradians (the projector pupil) may be regarded as substantially collimated. This collimated light falling on a single spherical facet and, filling the facet, is imaged as a point 36b at the focus of the spherical facet 36a. All light falling on the small spherical facet 36a passes through this image point 36b on its way to the exit pupil. The exit pupil is therefore a point projection of the facet 36a itself for this one image point. But because the individual facets are arranged in a spherical array, all their separate exit pupils overlap whre the normal image of the projector pupil would be formed, at the pilot's head. The shape of the exit pupil is identical with that of the facet, then, and the size of the pupil is determined by the ratio of the facet focal length of the pilot/screen separation. As illustrated in FIG. 1b, a 1-mm × 1-mm facet with a 15-mm radius of curvature (focal length 7.5 mm) will yield a 1-ft × 1-ft exit pupil at a pilot/screen distance of 7.5 feet. Light from that individual image point, associated with that particular facet, can therefore be seen by the pilot if his eyes are anywhre × a 1-ft ×1-ft window at his face position. Exit pupils of other shapes and sizes can be produced by employing other facet sizes and radii.

The dimpling of the mirror 36 gives the designer essentially complete control over the exit pupil for a real image. However, control over exit pupil sizes is gained at the expense of rendering a continuous image non-continuous. The effect of dimpling the mirror is to render the image in a pointilist style. That is to say, as much of the continuous image which may have been projected onto the surface of a single facet will be combined and lumped into a single point of light at the focus of the dimple. The scene actually observed by the pilot in the simulator will consist of a myriad of tiny points 36b suspended in air about 7.5 mm in front of the mirror 36 surface. If examined closely, the image would appear much as a fine half-tone reproduction. When sufficiently far away, however, these discrete points will blend into an illusion of continuity. As long as the dimple size (point separation) is below the resolution of the eye, nothing is lost. Even if the dimple size is a little above the resolution of the eye, the effect will probably be completely satisfactory. The human attention processes will enhance the image and suppress the underlying discrete structure just as one ignores the raster on a TV tube or the halftone pattern of newspaper photographs. The real price one has paid for exit pupil control is the inability ever to make use of a virtual image at infinity.

With further reference to FIG. 4, the fundamental role of the scanning periscope 34 is to relay imagery from the imitial displays 10a, 10b, to the final display 36 in a manner which conserves image brightness and resolution, to superpose image elements in their proper geometric relationship, and to produce, by scanning, a time-average full spherical field of view within the main display 36 using optics inherently limited to a hemisphere at best. As set forth hereinabove the scanning periscope 34 also operates to present to the viewer as undistorted scene of correct perspective.

Referring to FIG. 5, the initial display screens 10a, 10b are provided with a projected scene 14 in the same manner as that set forth in FIG. 3. The scanning periscope 34 comprises identical rotating portions 35, 35', situated within each of the initial displays 10a, 10b, a mirror 34a, a beam splitter 34b and a rotating projection head 40. The rotating portions 35, 35' of the scanning periscope 34 each comprise a fisheye pickup lens 35a located at a conjugate point with respect to the projection lens 12b. The fisheye scanning lens 35a is conventional, e.g., a Minolta Rokkor 16mm $f/2.8$, and is arranged to rotate about a single axis inclined at approximately 45° to the center line of the initial display 10a or 10b. As it rotates, the fisheye pickup lens 35a picks up the hemispherical image and provides same to a 1:1 relay lens 35b (approximately 50mm $f/1.4$). The relay lens 35b in turn provides the image to a collecting lens 35c, e.g., a Kodak AERO-EKTAR (12 inch $f/2.5$). The collecting lens 35c in turn provides the image to an achromatic doublet 35d (e.g., a 32 inch $f/7.5$). The combination of the fisheye pickup lens 35a, the relay lens 35b, the collecting lens 35c and the achromatic doublet 35d is provided within each initial display 10a, 10b, and each said combination rotates synchronously and in definite phase relationship with respect to the other such that the initial display 10a provides a forward hemisphere image to the main display 36 and the other initial display 10b provides a rear hemisphere image to the main display 36. Rotation of each of the aforesaid combinations is accomplished by any suitable means such as synchronous motors; rotation may be accomplished either continuously or in steps at a scan rate exceeding the critical flicker frequency (approximately 24 rps) such that the entire spherical field of the main display 36 appears continuous to an observer.

The image from the initial display 10a is provided to a mirror 34a and the image from the initial display 10b is provided to a beam splitter 34b. Both images are transmitted to a rotating projection head 40 located within the main display 36. The projection head 40 includes an achromatic doublet 40a (e.g., 32 inch $f/7.5$) which receives the reflected images from the initial displays 10a, 10b and provides same to a collecting lens 40b (e.g., Kodak Aero-Ektar, 12 inch $f/2.5$). The collecting lens 40b in turn provides the images to a roof mirror 40c which in turn provides the images to a 1:1 relay lens 40d (e.g., approximately 50mm $f/1.4$). The relay lens in turn transmits the images to a fisheye projection lens 40e (e.g., a Minolta Rokkor 16 mm $f/2.8$) which is located at a point conjugate with respect to the exit pupil of the main display 36. Of course, the simulator pilot's head 42 is arranged to be located at the exit pupil of the main display 36.

The projection head 40 is arranged to rotate in synchronism and in proper phase relationship with respect to the other rotating portions 35, 35', of the scanning periscope 34 by any suitable means such as synchronous motors.

Figure 6:
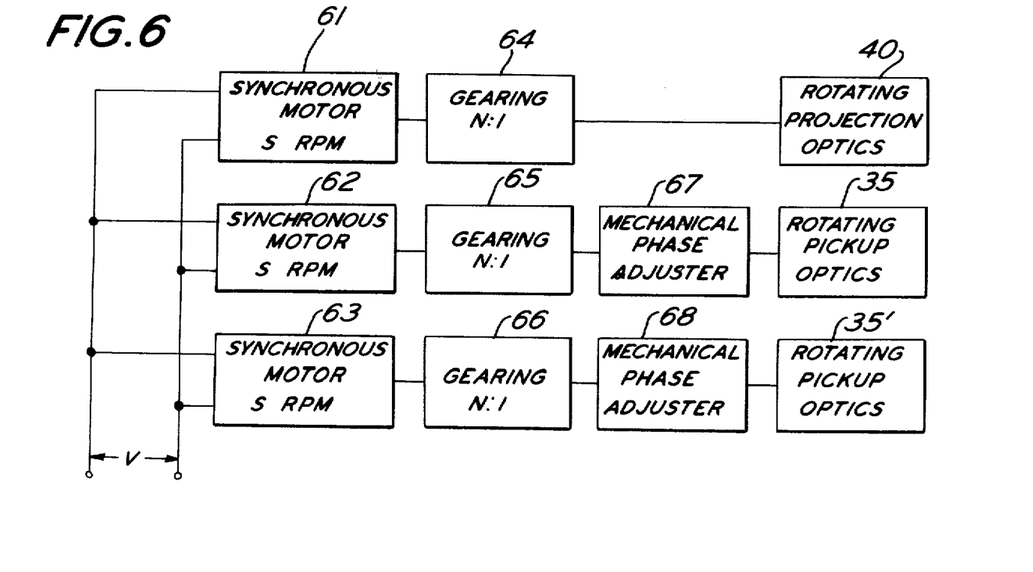
FIG. 6 is a block diagram showing means for rotating portions of the display system of FIG. 5 in synchronism and in proper phase relationship.

Referring to FIG. 6, means for rotating the projection optics 40 and the two pickup optics 35, 35' in synchronism and in proper relations is shown. Three identical synchronous motors 61, 62, and 63 are provided with 120 volts from a 60 Hz supply and drive respective gear arrangements 64, 65 and 66 each having an N:1 ratio where 1 ≤ N ≤ 2. The projection optics 40 are driven directly from gear arrangement 64 but both pickup optics 35, 35' are driven via respective mechanical phase adjusters 67 and 68. The phase adjusters 67, 68 insure that both pickup optics 35, 35' rotate in proper phase relationship with respect to each other and with respect to the projection optics 40.

With further reference to FIG. 5 and in summary, the scanning periscope 34 is a completely symmetrical 1:1 optical relay, terminating at each end with identical fisheye lenses. These fisheye lenses exhibit an instantaneous field of 180° and are arranged to rotate in exact synchronism about a perpendicular to the optical axis. Thus in the course of one revolution, the field of the fisheye sweeps out, and the periscope 34 relays a complete sphere. On the average, any given image point in the sphere is relayed through the periscope 50 percent of the time.

The scanning periscope 34 has one projection head 40 but two pickup heads 35, 35', the images formed by the two pickup head 35, 35' being superposed by a beam splitter 34b in the periscope. If now, it is arranged that one hemisphere is projected into one of the two first-stage display mirrors, and the complementary hemisphere projected in the opposite direction into the other first-stage display mirror, the scanning periscope 34 will combine the two and make both visible, in proper register, to the observer 42 within the main display mirror 36. If the separate hemisphere projections are substantially continuous, and if the scan rate of the periscope is high enough (about 24 rps), the entire spherical field will appear continuous to the observer 42.

The scanning periscope 34 serves therefore as a scene integrator, superposing in proper register as many scene elements or parts of the whole sphere as it is desirable or convenient to generate separately. It is possible therefore not only to assemble a full sphereical field of view in this manner, but also to synthesize within a spherical field a complex scene involving several independently controlled elements.

With further reference to FIG. 5, the function of the initial display screens 10a or 10b is to receive imagery from the scene element projector 12 and relay it to the pickup head 35a of the scanning periscope in a manner which conserves brightness and exactly counteracts the distortion introduced in the final display 36 by the separation of projection head and pilot. Since the pupils of both the scene element projector 12b and the scanning periscope pickup 35a are substantially small points, the indicated form of the screen would be a specular ellipsoid with the two pupils 12b and 35a at the foci. This would ensure maximum conservation of scene brightness. To counter the distortion introduced in the final display 36, the initial display (10a or 10b) must be geometrically similar. The final display screen 36 is a sphere. If the initial display mirror (10a or 10b) is an ellipsoid, true geometrical similarity is impossible; but if the ratio of focal separation to mean diameter is made the same for the two mirrors, only very minor and probably indiscernable local distortion will remain.

Optically it is desirable that initial 10a, 10b and final display 36 mirrors by the same size. Complete symmetry is thereby realized and some awkward problems with parallax obviated. Economically, however, it is desirable to employ the smallest possible mirror for the initial displays 10a, 10b. A sensible approach is to place the two pupils 12b and 35a as close together as is physically possible, then make the initial display mirror 10a or 10b just large enough to satisfy the required condition of geometrical similarity.

In one embodiment, the minimum spacing possible between the two pupils 12b and 35a is 5 inches, determined by the extreme envelopes of the two optical systems. The mean diameter of the initial display mirror, for geometrical similarity, is therefore (5/24) (180) = 37.5 inches, assuming a 24-inch separation of pilot and projector in the main display 36. From the fundamental properties of an ellipse, the major and minor axes are found to be 37.67 inches and 37.33 inches, respectively.

Dimpling of the initial display mirrors 10a, 10b in a manner similar to the main display mirror 36 is necessary to ensure filling the pickup pupil 35a for all positions or the projector. In a preferred embodiment an exit pupil 6 mm × 9 mm is required at the pickup pupil 35a. Dimples 0.2 mm × 0.3 mm with a focal length of 16 mm will produce such an exit pupil.

From the foregoing it should be observed that the display sybsystem is completely passive; that is, it contains no light sources. Its functions to relay with minimum loss of brightness and resolution the images projected into the initial displays, to expand the exit pupil in a useful and controlled manner, to correct the position of the center of perspective to the pilot's eye for all possible maneuver positions, and to superimpose the fundamental scene elements 14.

For clarity of presentation, an explanation of the term "conjugate points" as set forth in the foregoing portions of the disclosure is set forth below. Any imaging element, such as a lens or mirror, has the property of accepting light rays diverging from an object point and redirecting them so as to converge at an image point. In simple optical devices there is only one image point corresponding to a given object point. Such pairs of object and image points are called conjugate points, and object and image are said to be conjugate to each other.

When it is said in the disclosure that first stage projection and pickup are accomplished at conjuate points, it is meant that the projection lens and the pickup lens, both facing the first stage spherical display mirror, are so situated relative to each other and to the mirror that the mirror forms an image of the one lens on top of the second lens. The two lenses are placed to occupy, in the coordinate system of the mirror, points characterized by the object-image relation. The mirror thus accepts light from the projection lens and delivers it to the pickup lens, thereby insuring that what is projected by the first lens is seen by the second lens. The spherical mirror in this arrangement functions both as a display surface (since it is dimpled and a real image is physically located at the mirror) and as a field element, serving to relay light but not imagery.

Obviously many modifications and variations of the present invention are possible in the light of the above teachings. It is therefore to be understood that within the scope of the appended claims the invention may be practiced otherwise than as specifically described.

I claim:

1. Apparatus for displaying the image of a scene in proper perspective and with conservation of scene brightness, comprising:

a first substantially spherical dimpled mirror;

first scene projector means, positioned within said first mirror, for projecting an image of said scene upon said first mirror;

a second substantially spherical dimpled mirror having an entrance pupil and an exit pupil located at conjugate points;

second scene projector means, substantially positioned at the entrance pupil of said second mirror, for projecting the image of said scene upon said second mirror; and scene receptor and relay means, having a portion thereof positioned within said first mirror at a substantially conjugate point with respect to said first scene projector means, for receiving the reflected image from said first mirror and for providing said image to said second scene projector;

whereby said scene image may be viewed at said exit pupil of said second mirror.

2. Apparatus for displaying in proper perspective the images of a plurality of scenes while preserving scene brightness comprising:

a plurality of dimpled, substantially spherical, initial display mirrors each having an entrance pupil and exit pupil located at conjugate points;

a plurality of scene projectors each of which is substantially positioned at the entrance pupil of a respective one of said initial display mirrors and each of which is adapted to project an image of a selected one of said plurality of scenes onto a respective initial display mirror;

a dimpled, substantially spherical, final display mirror, having an entrance pupil and an exit pupil located at conjugate points;

projection means, substantially positioned at the entrance pupil of said final display mirror, for projecting the images of said plurality of scenes upon said final display mirror;

collecting means, operatively connected to said projection means, for providing said plurality of scene images to said projection means; and a plurality of scene receptors each of which is substantially positioned at the exit pupil of a respective one of said initial display mirrors and each of which is adapted to receive the image reflected from a respective initial mirror and to provide said image to said collecting means;

whereby said plurality of scene images may be viewed at said exit pupil of said final display mirror.

3. Apparatus according to claim 2 further including:

a plurality of first motive means, each of which is operatively connected to a respective one of said plurality of scene projectors, for rotating said scene projectors in synchronism and with a predetermined phase relationship; and second motive means operatively connected to said projection means for rotating said projection means.

4. Apparatus according to claim 3 wherein each of said plurality of scene projectors illuminates a selected portion of a respective initial display mirror.

5. Apparatus according to claim 4 wherein the exit pupil each initial display mirror is larger than the entrance pupil and the exit pupil of said final display mirror is larger than the entrance pupil of said final display mirror.

6. Apparatus according to claim 3 wherein said collecting means includes a plurality of reflecting means, each of which is responsive to an image provided by a respective one of said plurality of scene receptors, for transferring said images from said receptors to said projection means.

* * * * *